(12) United States Patent
Perich et al.

(10) Patent No.: US 11,433,700 B2
(45) Date of Patent: Sep. 6, 2022

(54) MAGNETIC HUB PLUG APPARATUS

(71) Applicants: Nick Perich, Warren, OH (US); Harvey Stewart, Warren, OH (US)

(72) Inventors: Nick Perich, Warren, OH (US); Harvey Stewart, Warren, OH (US)

( * ) Notice: Subject to any disclaimer, the term of this patent is extended or adjusted under 35 U.S.C. 154(b) by 341 days.

(21) Appl. No.: 16/869,750

(22) Filed: May 8, 2020

(65) Prior Publication Data
US 2021/0347203 A1 Nov. 11, 2021

(51) Int. Cl.
 *B60B 7/00* (2006.01)
 *B60B 7/02* (2006.01)
 *B60B 7/06* (2006.01)
 *B60B 7/08* (2006.01)

(52) U.S. Cl.
 CPC .............. *B60B 7/0013* (2013.01); *B60B 7/02* (2013.01); *B60B 7/066* (2013.01); *B60B 7/08* (2013.01); *B60B 2900/212* (2013.01); *B60B 2900/3312* (2013.01); *B60B 2900/931* (2013.01)

(58) Field of Classification Search
 CPC ......... B60B 7/0013; B60B 7/02; B60B 7/066; B60B 7/08; B60B 2900/212; B60B 2900/3312; B60B 2900/931
 See application file for complete search history.

(56) References Cited

U.S. PATENT DOCUMENTS

| | | | | |
|---|---|---|---|---|
| 3,089,738 A | * | 5/1963 | Steiner | B60B 37/10 384/473 |
| 4,752,759 A | | 6/1988 | Kazuyuki | |
| 4,834,464 A | * | 5/1989 | Frehse | F16C 33/723 384/624 |
| 5,066,071 A | * | 11/1991 | Kinser | F16C 33/6674 210/222 |
| 5,205,617 A | * | 4/1993 | Hoffmann | B60B 27/001 301/108.4 |
| 5,294,350 A | | 3/1994 | Murphy | |
| 5,860,708 A | | 1/1999 | Borders | |
| 6,676,227 B1 | | 1/2004 | Stanczak | |
| 7,220,359 B2 | | 5/2007 | Leimann | |
| 2021/0347203 A1 | * | 11/2021 | Perich | B60B 7/08 |

FOREIGN PATENT DOCUMENTS

DE 202020102334 U1 * 8/2020

* cited by examiner

*Primary Examiner* — Jacob B Meyer

(57) ABSTRACT

A magnetic hub plug apparatus for sealing a wheel hub and detecting wheel bearing failure includes a plug body having a plug outer side, a plug inner side, and a plug edge. A seal ring has a proximal perimeter coupled to the plug inner side, a distal perimeter, and a seal sidewall extending from the proximal perimeter to the distal perimeter. The seal ring is configured to sealingly fit within a wheel hub cap. A magnet extension is coupled to the seal ring. The magnet extension extends from the seal sidewall and dips within an oil reservoir of the wheel hub cap with each rotation. A magnet insert is coupled within the magnet extension to collect particles from a faulty wheel bearing. A plug grip is coupled to the plug body and extends from the plug outer side.

10 Claims, 5 Drawing Sheets

MAGNETIC HUB PLUG APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hub plug devices and more particularly pertains to a new hub plug device for sealing a wheel hub and detecting wheel bearing failure.

(2) Description of Related Art including information disclosed under 37 CFR 1.97 and 1.98.

The prior art relates to hub plug devices. Existing devices have various forms of ventilation and ways of extracting particulate build up. These known devices, however, do not provide any form of early detection for wheel bearing safety.

BRIEF SUMMARY OF THE INVENTION

An embodiment of the disclosure meets the needs presented above by generally comprising a plug body having a plug outer side, a plug inner side, and a plug edge. A seal ring has a proximal perimeter coupled to the plug inner side, a distal perimeter, and a seal sidewall extending from the proximal perimeter to the distal perimeter. The seal ring is configured to sealingly fit within a wheel hub cap. A magnet extension is coupled to the seal ring. The magnet extension extends from the seal sidewall and is configured to dip within an oil reservoir of the wheel hub cap with each rotation. A magnet insert is coupled within the magnet extension and is configured to collect particles from a faulty wheel bearing. A plug grip is coupled to the plug body and extends from the plug outer side.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
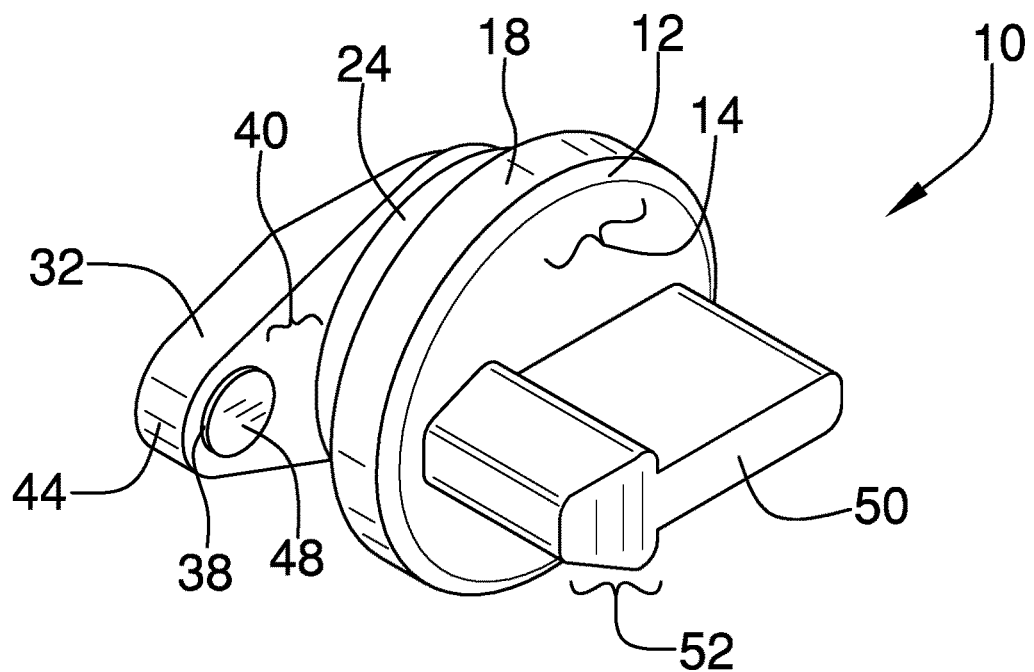
FIG. 1 is an isometric view of a magnetic hub plug apparatus according to an embodiment of the disclosure.
Figure 2:
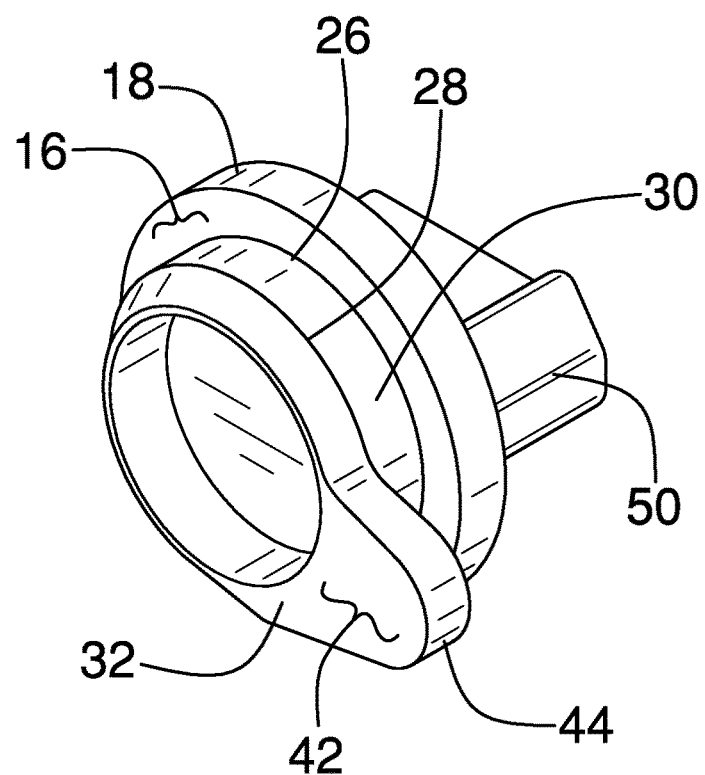
FIG. 2 is an isometric view of an embodiment of the disclosure.
Figure 3:
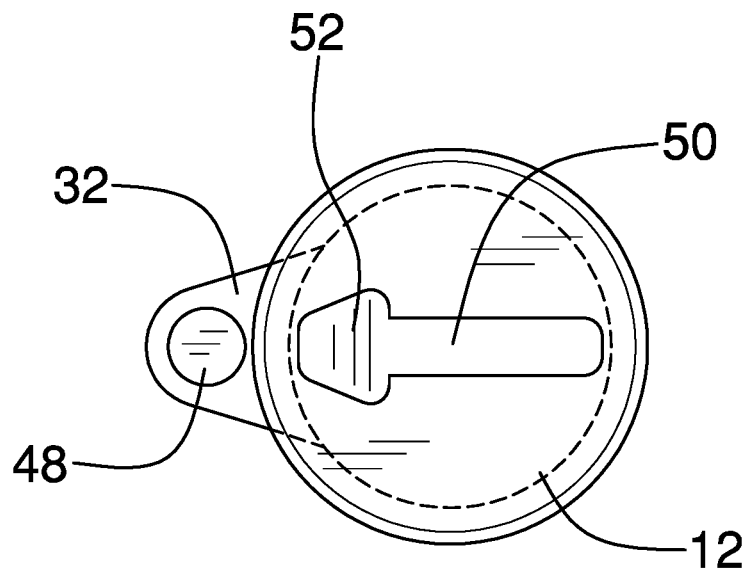
FIG. 3 is a rear elevation view of an embodiment of the disclosure.

With reference now to the drawings, and in particular to FIGS. 1 through 7 thereof, a new hub plug device embodying the principles and concepts of an embodiment of the disclosure and generally designated by the reference numeral 10 will be described.

As best illustrated in FIGS. 1 through 7, the magnetic hub plug apparatus 10 generally comprises a plug body 12 having a plug outer side 14, a plug inner side 16, and a plug edge 18. The diameter of the plug body 12 is greater than an oil aperture 20 of a truck's wheel hub cap 22. The plug body 12 may have at least one vent aperture extending from the plug outer side 14 through the plug inner side 16.

A seal ring 24 is coupled to the plug body 12. The seal ring 24 has a proximal perimeter 26 coupled to the plug inner side 16, a distal perimeter 28, and a seal sidewall 30 extending from the proximal perimeter 26 to the distal perimeter 28. The diameter of the proximal perimeter 26 and the seal sidewall 30 are smaller than the diameter of the plug body 12 and configured to sealingly fit within the oil aperture 20. The seal sidewall 30 may be flared adjacent the larger distal perimeter 28 to create a press fit within the oil aperture 20 of the wheel hub cap. The seal ring 24 may be an elastically deformable, rubberized material to allow for easy insertion and removal from the oil aperture 20 while forming a leak-free seal.

Figure 4:
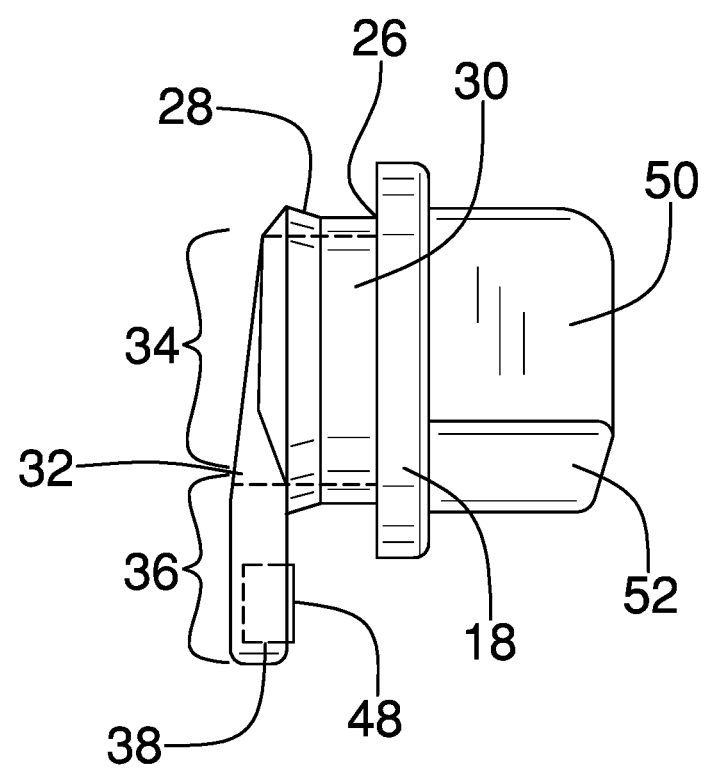
FIG. 4 is a side elevation view of an embodiment of the disclosure.
Figure 5:
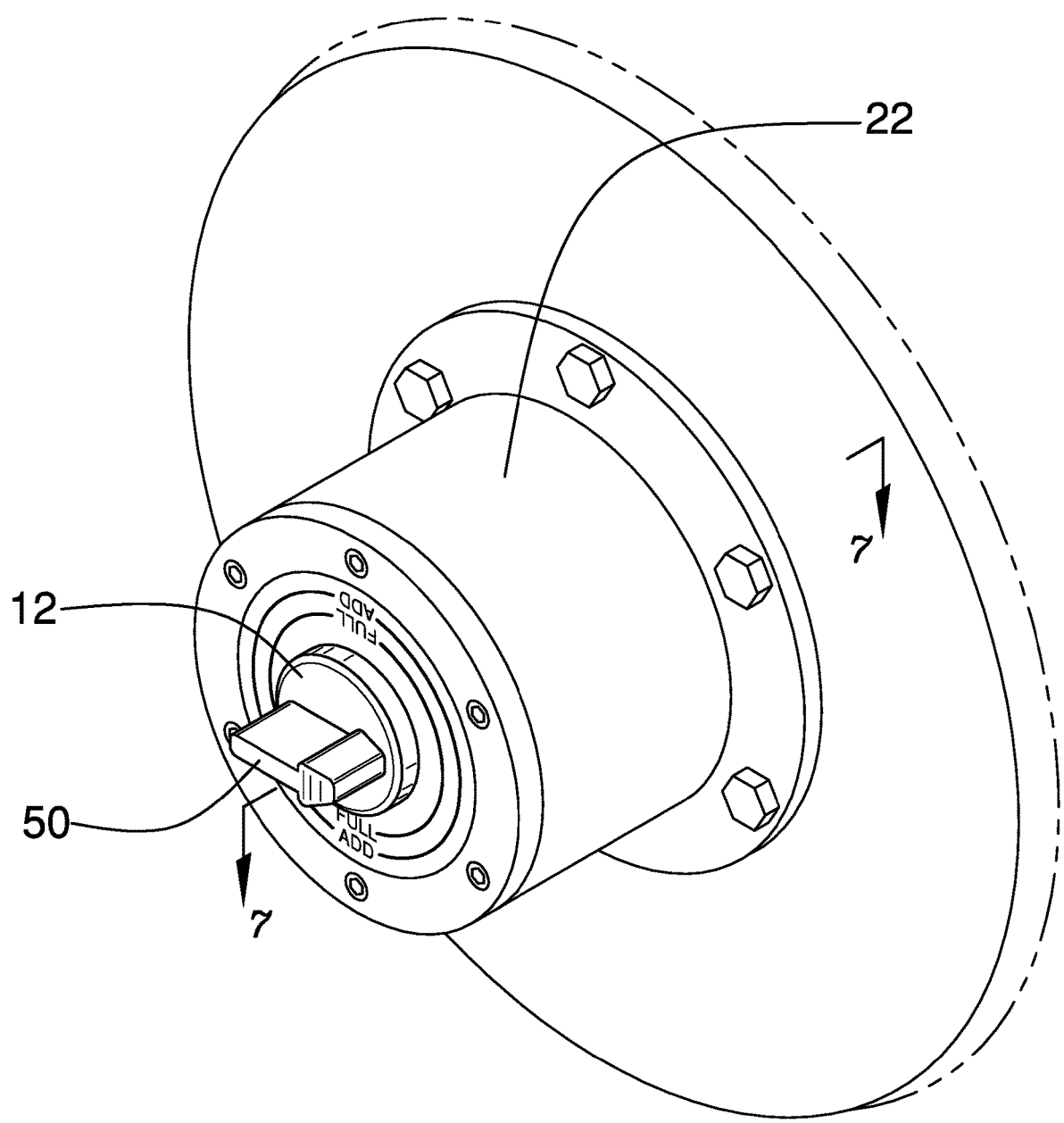
FIG. 5 is an in-use view of an embodiment of the disclosure.
Figure 6:
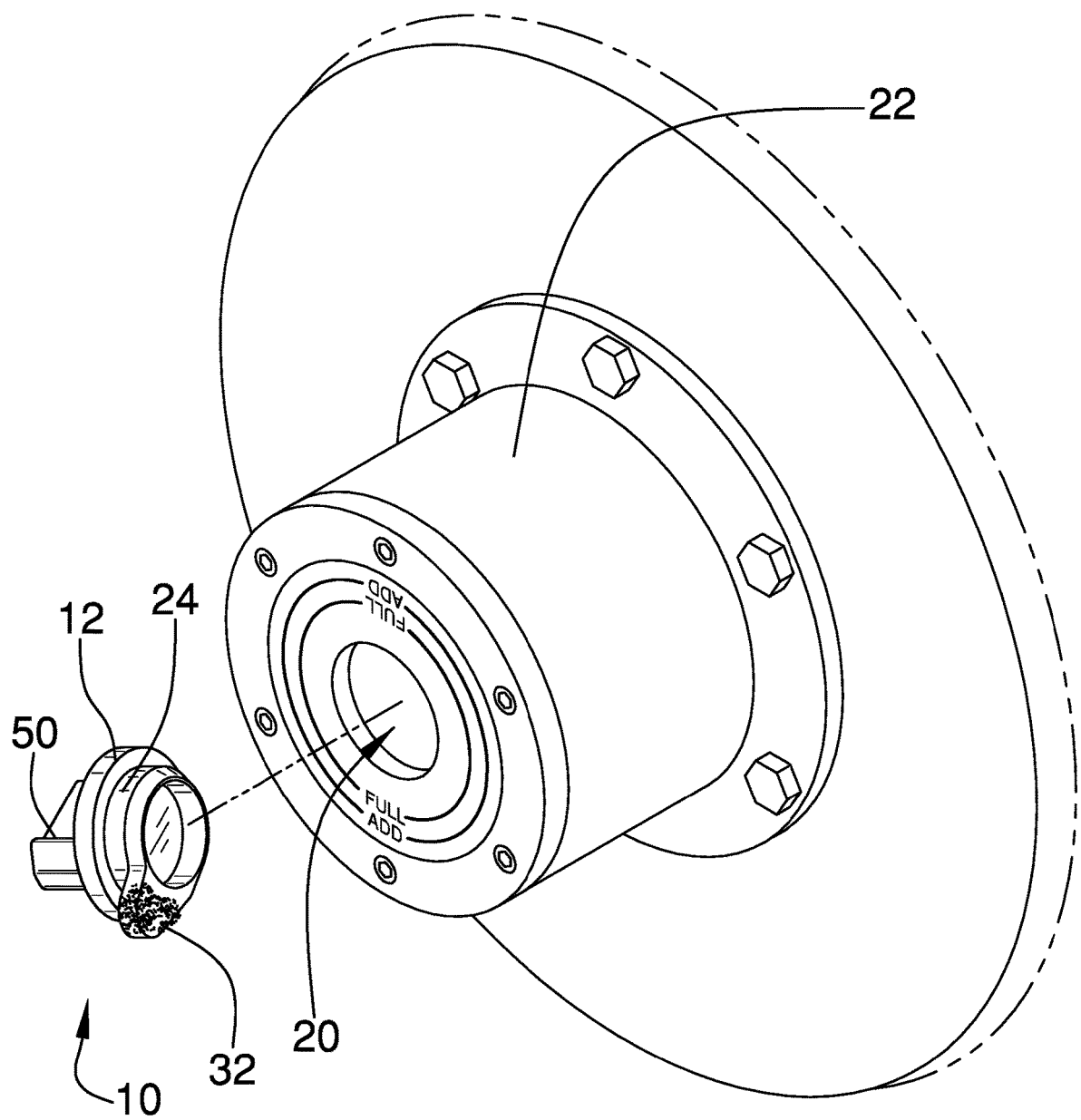
FIG. 6 is an in-use view of an embodiment of the disclosure.
Figure 7:
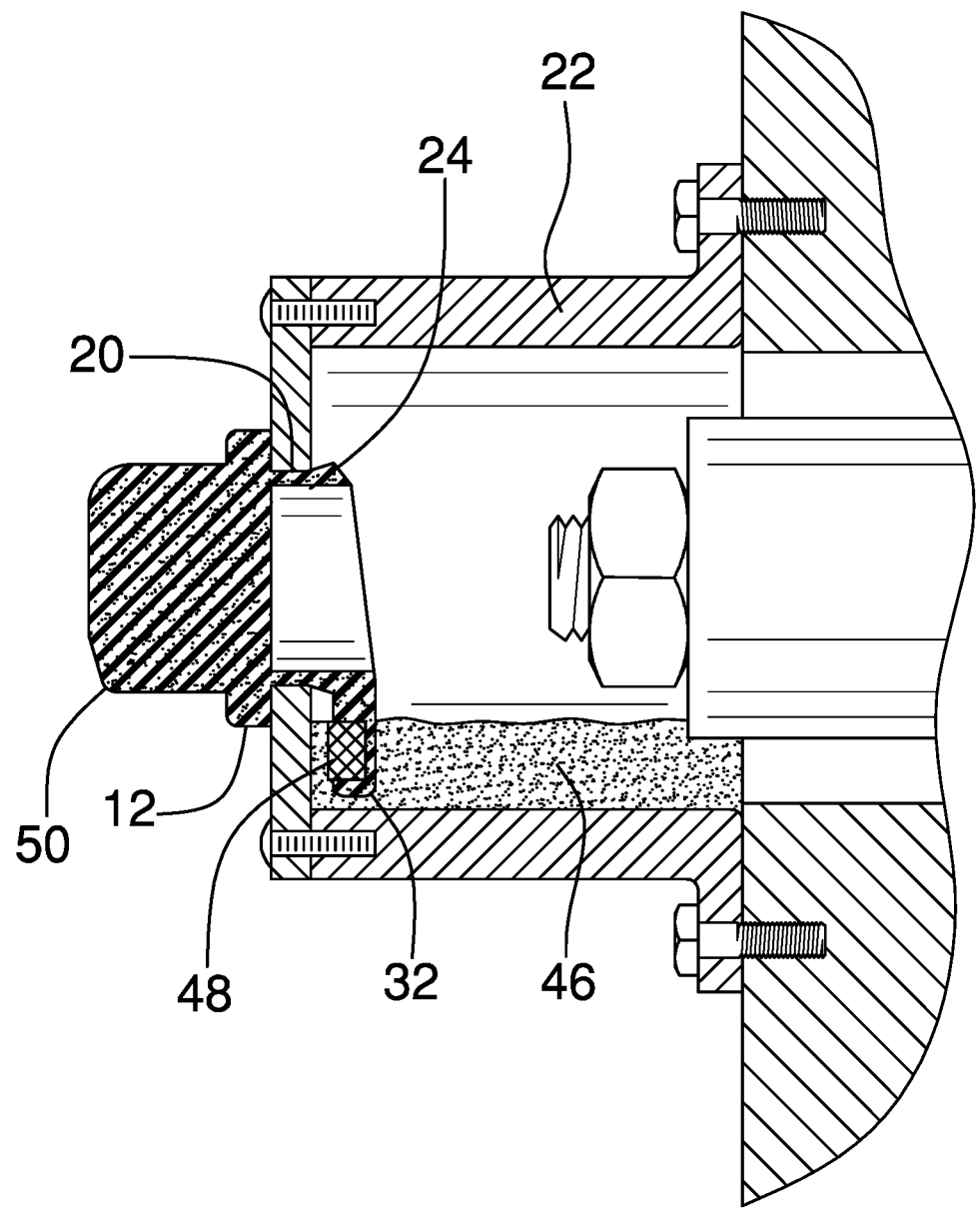
FIG. 7 is a cross-sectional view of an embodiment of the disclosure along the line 7-7 of FIG. 5.

A magnet extension 32 is coupled to the seal ring 24. The magnet extension 32 has an attachment portion 34 coupled to the distal perimeter 28 of the seal ring and an extension portion 36 extending from the attachment portion 34 past the plug edge 18. The attachment portion 34 may be tapered and the extension portion 36 may be a uniform thickness as shown in FIG. 4. The attachment portion 34 may additionally be annular and chamfered to return from the diameter of the distal perimeter 28 to the diameter of the proximal perimeter 26. The extension portion 36 may be a rounded wedge shape. A magnet aperture 38 may extend from an extension outer side 40 towards an extension inner side 42 adjacent a rounded distal end 44 of the extension portion. The magnet extension 32 extends perpendicularly from the seal sidewall 30 and is configured to dip within an oil reservoir 46 of the wheel hub cap with each rotation.

A magnet insert 48 is coupled within the magnet extension 32. The magnet insert 48 is coupled within the magnet aperture 38 when present and otherwise may be imbedded between the extension inner side 40 and the extension outer side 42. The magnet insert 48 is configured to collect particles from a faulty wheel bearing.

A plug grip 50 is coupled to the plug body 12. The plug grip 50 extends from the plug outer side 14 to allow the user to easily rotate and remove the apparatus from the wheel hub cap 22. The plug grip 50 may have a flared portion 52 oriented towards the magnet extension 32 to allow the user to rotate the apparatus 10 and knowingly pass the extension portion 36 through the oil reservoir 46. The plug grip 50 may be 50 an extruded arrow shape.

In use, the magnet extension 32 and the seal ring 24 are inserted into the wheel hub cap 22. After certain intervals of use, the user may then rotate the apparatus 10 using the plug grip 50 through the oil reservoir 46 one final time while the vehicle is stopped and then remove the apparatus 10 from the wheel hub cap 22. By examining the magnet extension 32, particularly proximal the magnet insert 48, the user will then be able to detect metal shavings from a wheel bearing problem in order to fix the problem before it worsens and causes a major safety issue.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A magnetic hub plug apparatus comprising:
   a plug body, the plug body having a plug outer side, a plug inner side, and a plug edge;
   a seal ring coupled to the plug body, the seal ring having a proximal perimeter coupled to the plug inner side, a distal perimeter, and a seal sidewall extending from the proximal perimeter to the distal perimeter, the seal ring being configured to sealingly fit within a wheel hub cap;
   a magnet extension coupled to the seal ring, the magnet extension extending from the seal sidewall and being configured to dip within an oil reservoir of the wheel hub cap with each rotation;
   a magnet insert coupled within the magnet extension, the magnet insert being configured to collect particles from a faulty wheel bearing; and
   a plug grip coupled to the plug body, the plug grip extending from the plug outer side.

2. The magnetic hub plug apparatus of claim 1 further comprising the plug grip having a flared portion oriented towards the magnet extension.

3. The magnetic hub plug apparatus of claim 2 further comprising the plug grip being an extruded arrow shape.

4. The magnetic hub plug apparatus of claim 1 further comprising the seal sidewall being flared adjacent the distal perimeter.

5. The magnetic hub plug apparatus of claim 1 further comprising the magnet extension being a rounded wedge shape.

6. The magnetic hub plug apparatus of claim 5 further comprising the magnet insert being coupled within the magnet extension adjacent a rounded distal end thereof.

7. The magnetic hub plug apparatus of claim 1 further comprising the magnet insert being coupled within a magnet aperture of the magnet extension, the magnet aperture extending from an extension outer side towards an extension inner side.

8. The magnetic hub plug apparatus of claim 1 further comprising the magnet extension having an attachment portion coupled to the distal perimeter of the seal ring and an extension portion extending from the attachment portion.

9. The magnetic hub plug apparatus of claim 8 further comprising the attachment portion being tapered and the extension portion being a uniform thickness.

10. A magnetic hub plug apparatus comprising:
    a plug body, the plug body having a plug outer side, a plug inner side, and a plug edge;
    a seal ring coupled to the plug body, the seal ring having a proximal perimeter coupled to the plug inner side, a distal perimeter, and a seal sidewall extending from the proximal perimeter to the distal perimeter, the seal sidewall being flared adjacent the distal perimeter, the seal ring being configured to sealingly fit within a wheel hub cap;
    a magnet extension coupled to the seal ring, the magnet extension having an attachment portion coupled to the distal perimeter of the seal ring and an extension portion extending from the attachment portion, the attachment portion being tapered and the extension portion being a uniform thickness, the extension portion being a rounded wedge shape, the magnet extension having a magnet aperture extending from an extension outer side towards an extension inner side adjacent a rounded distal end of the attachment portion, the magnet extension extending from the seal sidewall and being configured to dip within an oil reservoir of the wheel hub cap with each rotation;
    a magnet insert coupled within the magnet extension, the magnet insert being coupled within the magnet aperture, the magnet insert being configured to collect particles from a faulty wheel bearing; and
    a plug grip coupled to the plug body, the plug grip extending from the plug outer side, the plug grip having a flared portion oriented towards the magnet extension, the plug grip being an extruded arrow shape.

* * * * *